United States Patent [19]
Hufford

[11] Patent Number: 5,555,967
[45] Date of Patent: Sep. 17, 1996

[54] VIBRATORY DISTRIBUTOR FOR BULK ARTICLES

[75] Inventor: David W. Hufford, Walla Walla, Wash.

[73] Assignee: Key Technology, Inc., Walla Walla, Wash.

[21] Appl. No.: 377,212

[22] Filed: Jan. 23, 1995

[51] Int. Cl.⁶ ........................................ B65G 27/16
[52] U.S. Cl. ............................... 198/359; 198/771
[58] Field of Search ........................ 198/359, 370.01, 198/771; 209/920; 222/199, 200, 561

[56] References Cited

U.S. PATENT DOCUMENTS

| | | | |
|---|---|---|---|
| Re. 26,291 | 10/1967 | Carrier, Jr. | 198/771 |
| 438,527 | 10/1890 | Coxe . | |
| 920,972 | 5/1909 | Mathewson . | |
| 1,345,858 | 7/1920 | Jenkins . | |
| 1,632,199 | 6/1927 | Schnath . | |
| 1,955,032 | 4/1934 | Stevenson, Jr. | 209/90 |
| 2,111,663 | 3/1935 | Graemiger | 83/44 |
| 2,198,126 | 4/1940 | Rein | 209/85 |
| 2,642,980 | 8/1953 | Soucek | 198/771 |
| 2,649,224 | 8/1953 | Bardet | 222/197 |
| 3,043,420 | 7/1962 | Kelly | 198/359 |
| 4,313,535 | 2/1982 | Carmichael | 198/766 |
| 4,457,840 | 7/1984 | Nagl | 209/257 |
| 4,465,592 | 8/1984 | Nagi | 209/236 |
| 4,774,893 | 10/1988 | Dumbaugh | 110/186 |
| 4,936,489 | 6/1990 | Blain et al. | 222/200 |

Primary Examiner—Karen Merritt
Assistant Examiner—James W. Keenan
Attorney, Agent, or Firm—Wells, St. John, Roberts, Gregory & Matkin, P.S.

[57] ABSTRACT

A vibratory distributor 10 is described in preferred form having an elongated vibratory bed 16 for conveying bulk articles in a flowing stream past a plurality of metering gate stations 12 to selectively distribute the articles at the stations. A metering gate assembly 40 at each station includes a stationary upper metering plate 44 and a lower movable metering plate 46. Each of the plates 44, 46 have matching elongated metering apertures formed therein at evenly spaced center-to-center intervals across the width of the flowing stream. Each of the elongated apertures 62, 64 is oriented at a diagonal angle to the direction of flow with a segment of each aperture laterally overlapping an adjacent aperture. The apertures 62, 64 have parallelogram shapes. A screw gate drive 78 is connected to the lower metering plate 46 to move the plate 46 to adjust the relative alignment of the apertures to regulate the metering of the articles at each of the stations 12.

28 Claims, 9 Drawing Sheets

VIBRATORY DISTRIBUTOR FOR BULK ARTICLES

TECHNICAL FIELD

This invention relates to vibratory distributor systems for distributing or metering bulk articles, such as bulk food articles, from a moving stream of bulk articles, particularly bulk food items.

BACKGROUND OF THE INVENTION

The use of vibratory or shaker conveyors or vibratory distributors to distribute or meter bulk articles, such as bulk food articles, has been common for many years. One technique has been to provide proportional gate stations at various locations along the length of an elongated shaker conveyer. Generally, transverse metering apertures are formed in a conveyor bed at each gate station to enable the articles to fall by gravity through the metering apertures into receiving hoppers or storage containers or onto diversion conveyers Transverse gates are positioned at the gate stations for transverse sliding movement to selectively cover the apertures to restrict or enlarge the effective opening of the apertures to meter the amount or proportion of the articles that are diverted from the main stream at each gate station. Generally the articles that are diverted at each station are taken from a particular lateral segment of the main stream, rather than substantially uniformly across the full width of the main stream. Furthermore, the slide gates and supporting structure extends transversely outward from the side of the vibratory shaker a substantial distance when the gate or aperture is fully open, thereby substantially increasing the effective width of the vibratory shaker.

One of the objects and advantages of the present invention is to provide a bulk article vibratory distributor having one or more gating stations along its length that is able to accurately meter or divert bulk material from the main stream across substantially the full width of the stream independent of the amount of articles being diverted.

An additional object and advantage of the present invention is to provide a bulk article vibratory distributor in which the gate mechanism for opening and closing the gate to divert articles from across the full width of the main stream requires movement far less than the full width of the main stream or conveyor bed.

These and other objects and advantages of the present invention will become apparent upon careful consideration of the following description of a preferred embodiment of the invention.

BRIEF DESCRIPTION OF THE DRAWINGS

A preferred embodiment of the present invention is illustrated in the accompanying drawings, in which:

FIGS. 7–9 is a series of schematic views illustrating the progressive closing of a metering gate, in Which FIG. 7 illustrates the gate fully open;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article: 1, Section 8).

Figure 1:
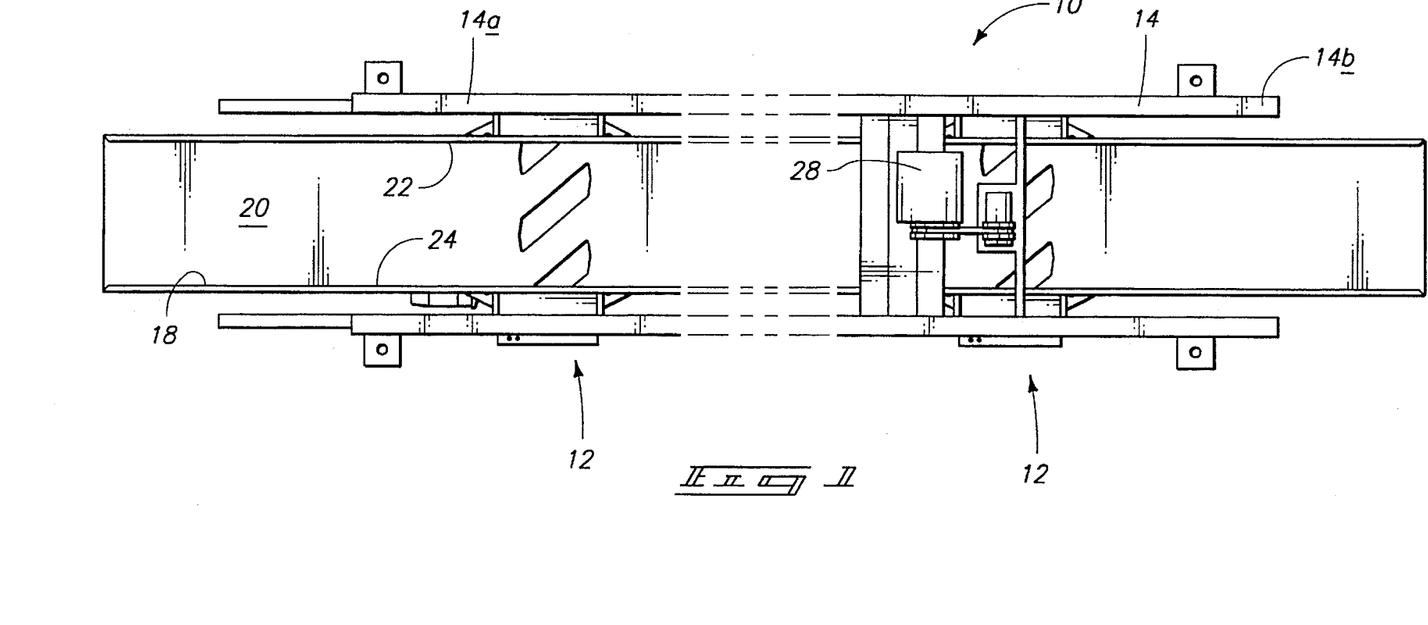
FIG. 1 is a fragmentary plan view of a preferred embodiment of a vibratory distributor illustrating a plurality of longitudinally spaced metering gates for distributing bulk articles from a main stream of bulk articles.
Figure 2:
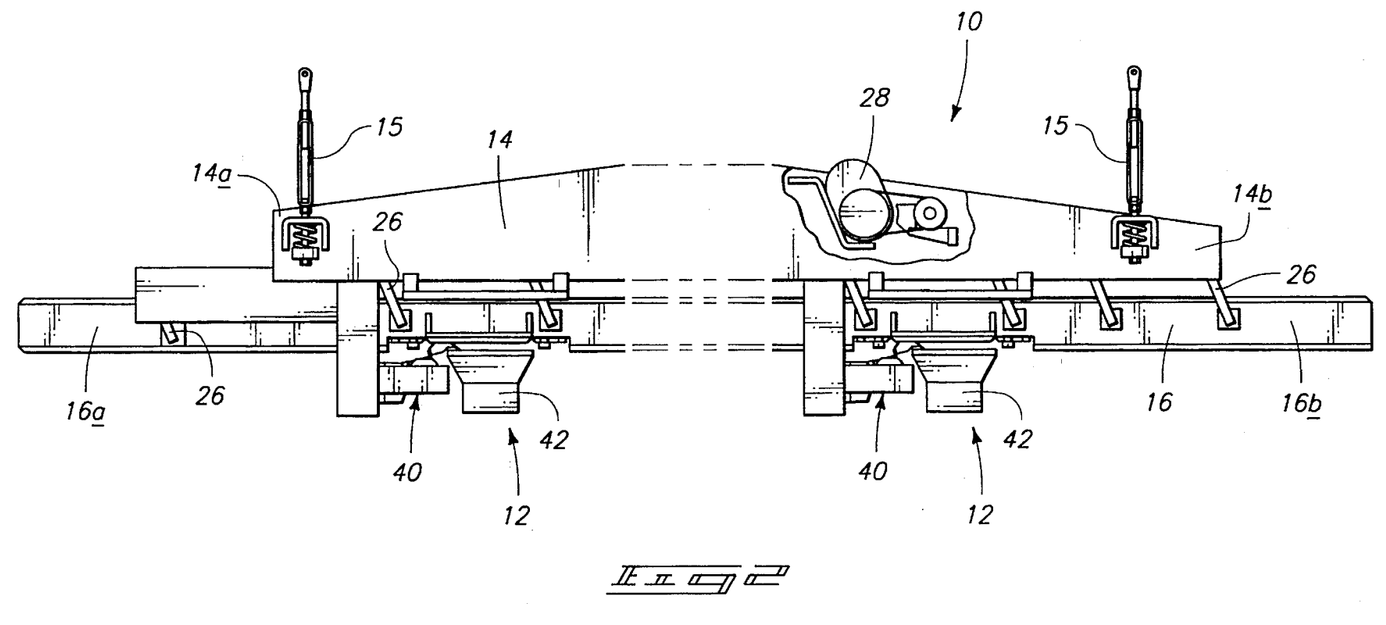
FIG. 2 is an side elevational view of the vibratory distributor illustrated in FIG. 1.

A preferred vibratory distributor is illustrated in FIGS. 1 and 2 and identified generally with the numeral 10. The vibratory distributor 10 vibratorily conveys bulk articles, such as food bulk articles, in an evenly distributed article stream past a plurality of metering gate stations 12 to selectively discharge selected amounts of the articles from the stream at each station 12. Depending upon the circumstances, all, part or none of the articles may be discharged at any particular station 12.

The distributor 10 has an elongated supporting frame 14 resiliently supporting an elongated vibratory conveyor bed 16. The supporting frame 14 preferably is an overhead supporting frame on a floor or pedestal supporting frame depending upon the application, location constraints and desires of the customer. The supporting frame, 14 illustrated in the accompanying drawings, particularly FIGS. 1 and 2, is a overhead model that is hung from a ceiling or overhead structure. The frame 14 extends between a front frame end 14a and a rear frame end 14b. The frame 14 is suspended by hangers 15 from a ceiling or overhead structure (not shown).

The conveyor bed 16 is elongated and extends from an infeed end and an outfeed end past the metering gate stations 12. The conveyor bed 16 has a conveying trough 18 with a article support surface 20 that extends laterally between side walls 22 and 24 and longitudinally between the infeed end 16a and the outfeed end 16b.

The conveyor bed 16 is resiliently supported to the frame 14 by support springs 26 that permit bed 16 to vibrate relative to frame 14. In the preferred embodiment, the support springs 26 are inclined leaf springs that cause the conveyor bed 16 to reciprocate at an inclined angle to cause the articles to move upward and forward during each vibration stroke to maintain the articles in an evenly distributed stream with a wide swath between the bed sidewalls 22 and 24 and to advance the articles in a flow direction dictated by the vibrational motion and the configuration of the conveyor bed 16.

The distributor 10 preferably has a linear vibratory drive 28 mounted on the frame 14 to vibrate the frame 14 and transmit such vibration through the springs 26 to the conveyor bed 16. The theory and operation of such a vibratory drive 28 is described in U.S. Pat. No. 4,313,535, granted Feb. 2, 1982, to Dumont M. Carmichael and initially assigned to a predecessor of the present Applicant.

At each metering gate station 12, the distributor 10 has a metering gate assembly generally designated with the numeral 40 that meters articles from the flowing article stream to a receiving chute 42. The assembly 40 includes an upper metering gate element 44 and a lower metering gate element or slide 46. Preferably the upper metering gate element 44 is defined by a section of the article support surface 20 that extends transversely between the bed sidewalls 22 and 24.

The lower metering gate element 46, preferably constructed of high density plastic bearing material extends transversely across the conveyor bed 16, between ends 48 and 50, immediately underneath and in engagement with the upper metering gate element 44 (FIGS. 4–9). The lower metering gate element 46 has parallel side edges 52 and 54.

The assembly 40 includes edge supports or tracks 56 and 58 that engage the side edges 52 and 54 (FIGS. 5 and 10) respectively to slidably support the lower metering gate to enable the lower metering gate element 46 to be moved transverse to the direction of article flow relative to the upper metering gate element 44.

Importantly, the upper and lower metering gate elements have matching metering apertures 62 and 64 respectively formed in the metering gate elements that permit the flow of articles therethrough when matching or corresponding apertures 62 and 64 are in vertical alignment with each other and to prevent flow of articles therethrough when the matching or corresponding metering apertures are in misalignment with each other. For purposes of illustration only, the bed 16 has a twenty-four inch stream width, in which the upper metering gate element has metering apertures 62a, 62b, and 62c formed therein at evenly spaced twelve-inch intervals transversely across the bed 16 with full-size central aperture 62b centered in the middle of the bed 16 to meter the articles flowing in the central portion of the stream. If the bed 16 had a seventy-two inch width, then the upper metering gate element would have five full-size central apertures 62b. It should be noted that apertures 62a and 62c are side apertures and are only partial size apertures since they interface with the side walls 22 and 24 for removing articles that flow along the sides. The lower gate element 46 has matching metering apertures 64a, 64b, and 64c that correspond substantially in shape and spacing to the apertures 62a, 62b, and 62c. It may be desirable to make the apertures 64 of a somewhat larger size than the apertures 62.

Each of the metering apertures 62, 64 are elongated and are oriented at a diagonal angle "A" to the flow direction (FIG. 6) with a segment of each aperture laterally overlapping or nearly overlapping an adjacent aperture 62, 64 to permit metering of articles across the full width of the article stream. Preferably, the apertures 62, 64 are oriented at a diagonal angle of between 35 degrees and 60 degrees, inclusive, and most preferably at a diagonal angle of approximately 40 degrees.

Figure 6:
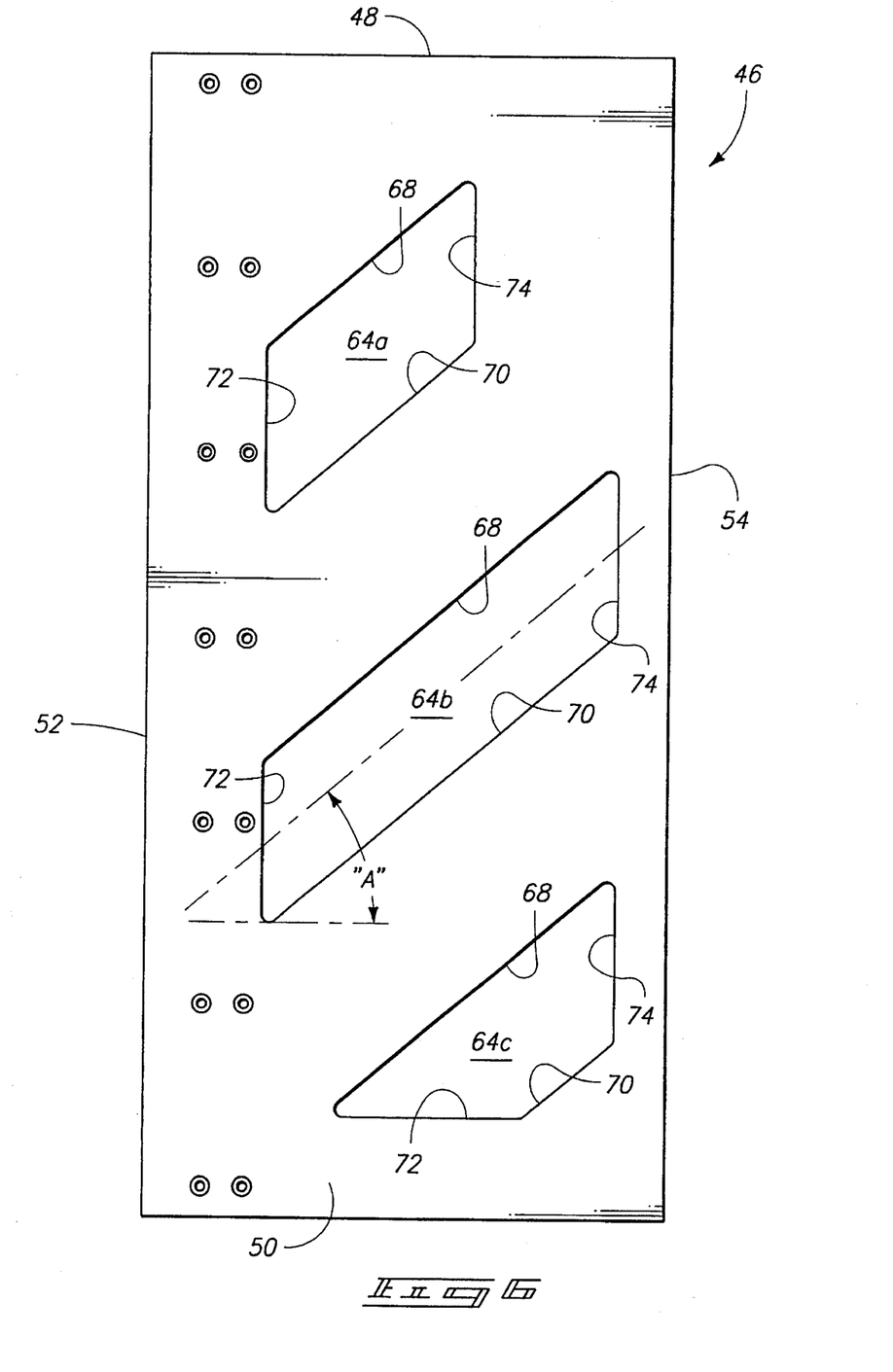
FIG. 6 is an isolated plan view of a gate.
Figure 11:
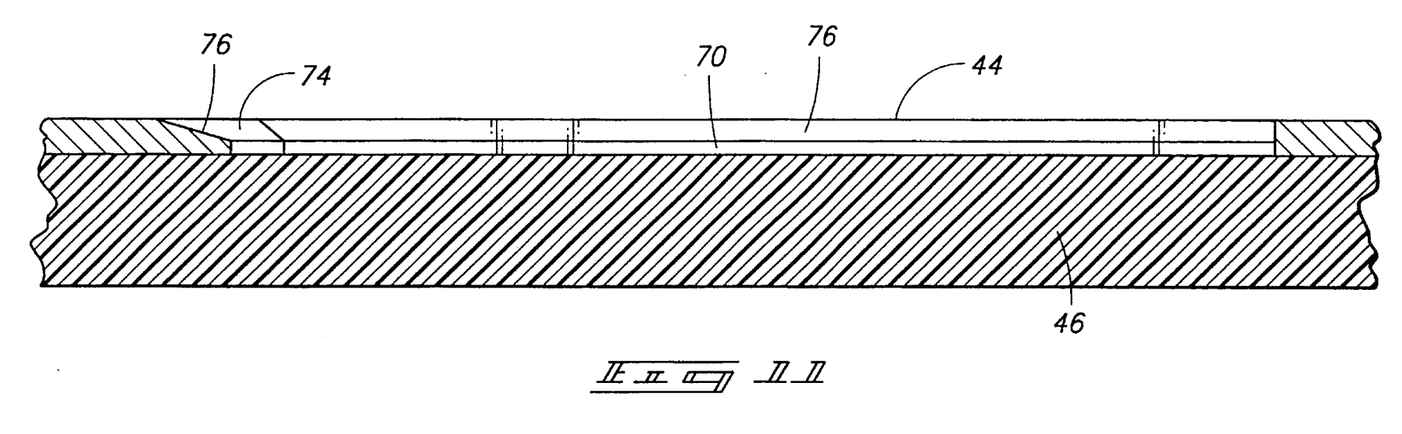
FIG. 11 is a fragmentary vertical cross-sectional view taken along line 11—11 in FIG. 7 illustrating a portion of the metering gate.
Figure 12:
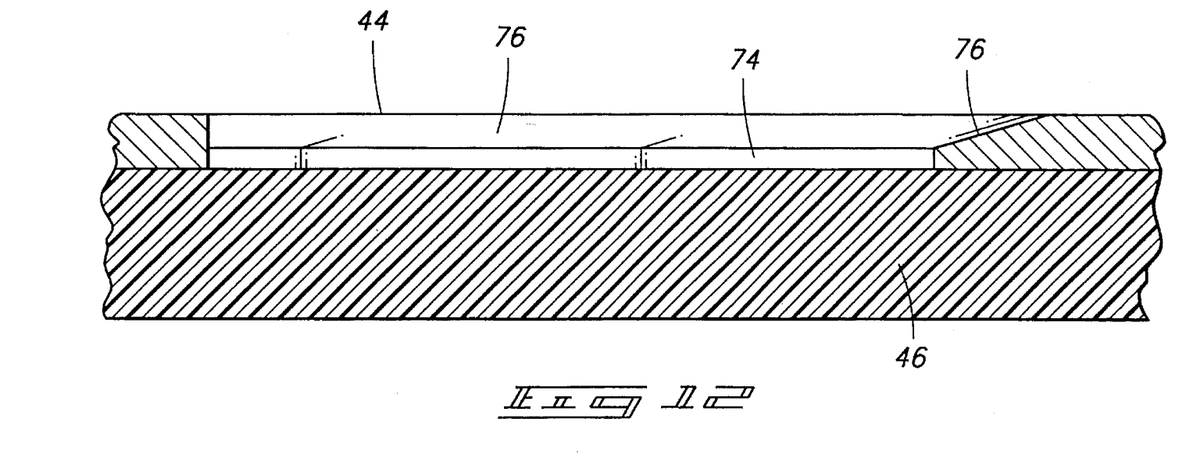
FIG. 12 is a fragmentary vertical cross-sectional view taken along line 12—12 in FIG. 7 similar to FIG. 11, except taken at 90 degrees with respect to FIG. 11.

Preferably, each of the elongated metering apertures 62, 64 has a parallelogram shape with elongated parallel side edges 68 and 70 and parallel end edges 72 and 74 (FIGS. 6, 11 and 12). Applicant has found that for several types of articles, particularly dried raisins, that metering aperture width dimension normal to the flow direction of approximately 2.5 inches and length dimension parallel to the flow direction of approximately 10 inches is quite adequate for the apertures 62. The normal width and parallel length dimensions of the apertures 64 may be equal to or somewhat larger than the size dimensions of the apertures 62. Edge bevels 76 (FIGS. 11. and 12) are formed on the edges 70 and 74 in the apertures 62 to facilitate the migration of the stream of articles over the apertures, particularly if the apertures are partially or fully closed (misaligned).

Figure 7:
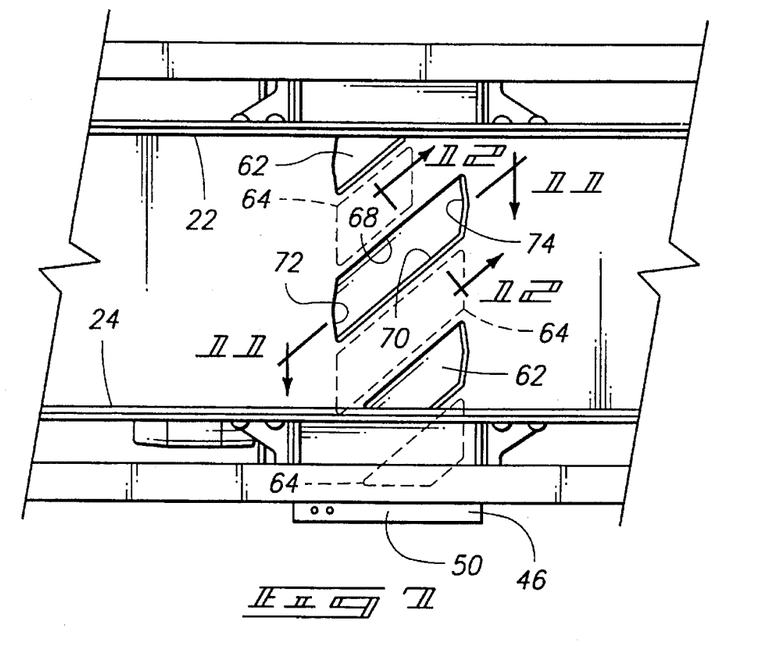
Figure 9:
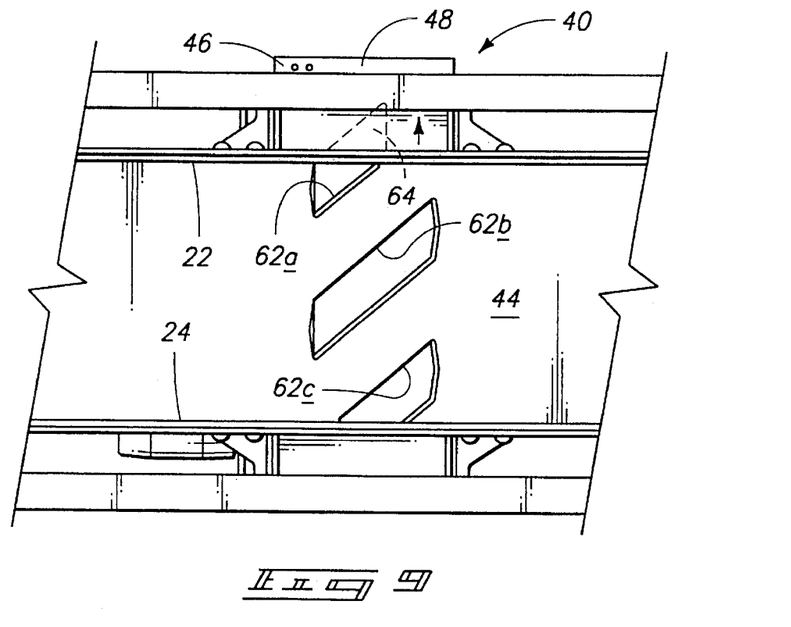
FIG. 9 illustrates the metering gate fully closed.

The metering gate assembly 40 includes a gate drive 78 that is operatively connected to the lower metering gate element 46 for moving the element 46 transverse to the flow direction in a stroke between a fully open position, in which the metering apertures 62 and 64 are fully vertically aligned with each other as illustrated in FIG. 7, and a fully closed position, in which the metering apertures 62 and 64 are fully misaligned with each other as illustrated in FIG. 9. The gate drive 78 is capable of accurately moving the element 46 to any intermediate position to accurately meter the amount or volume of articles passing through the apertures 62 and 64.

Figure 3:
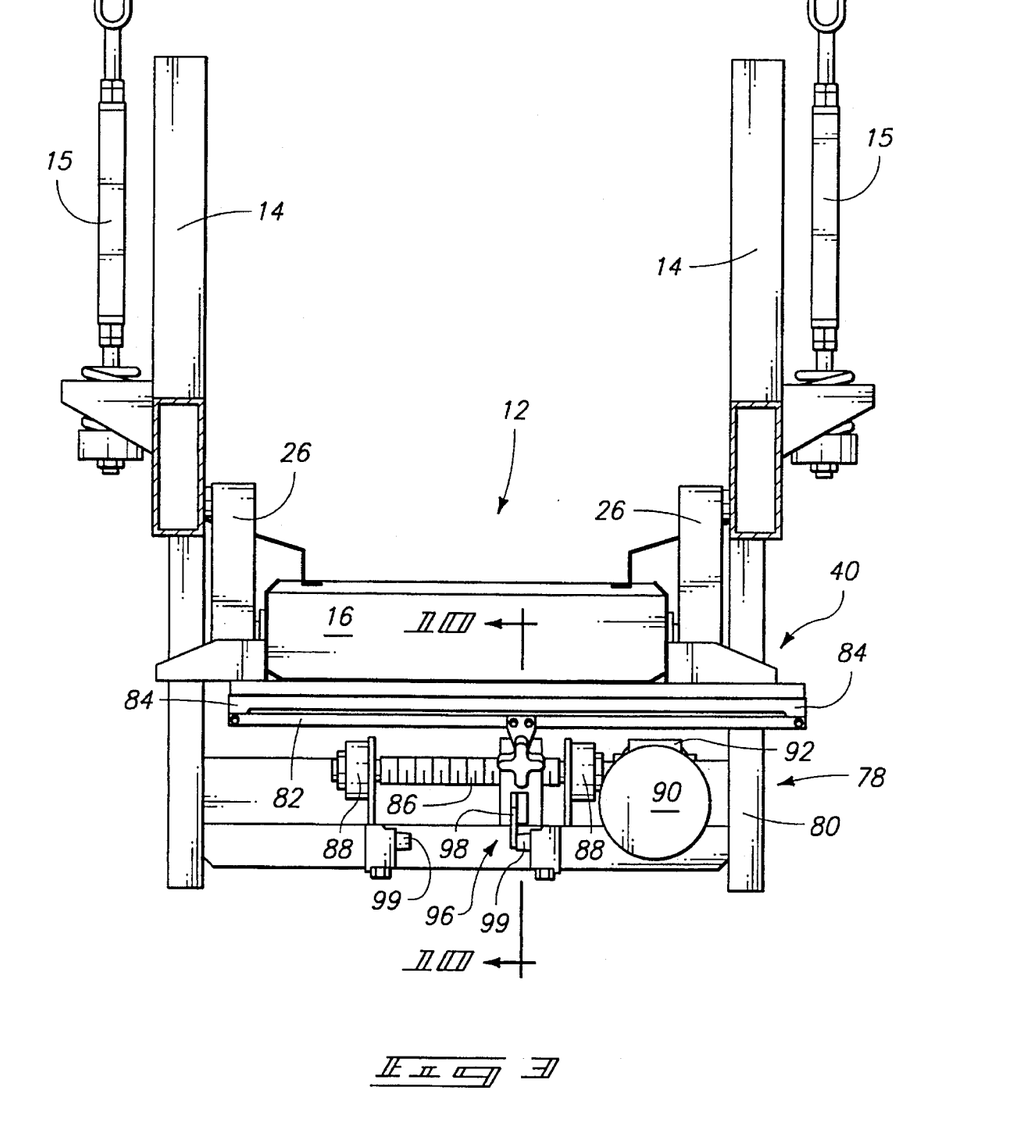
FIG. 3 is an end view of the vibratory distributor illustrated in FIG. 1.
Figure 4:
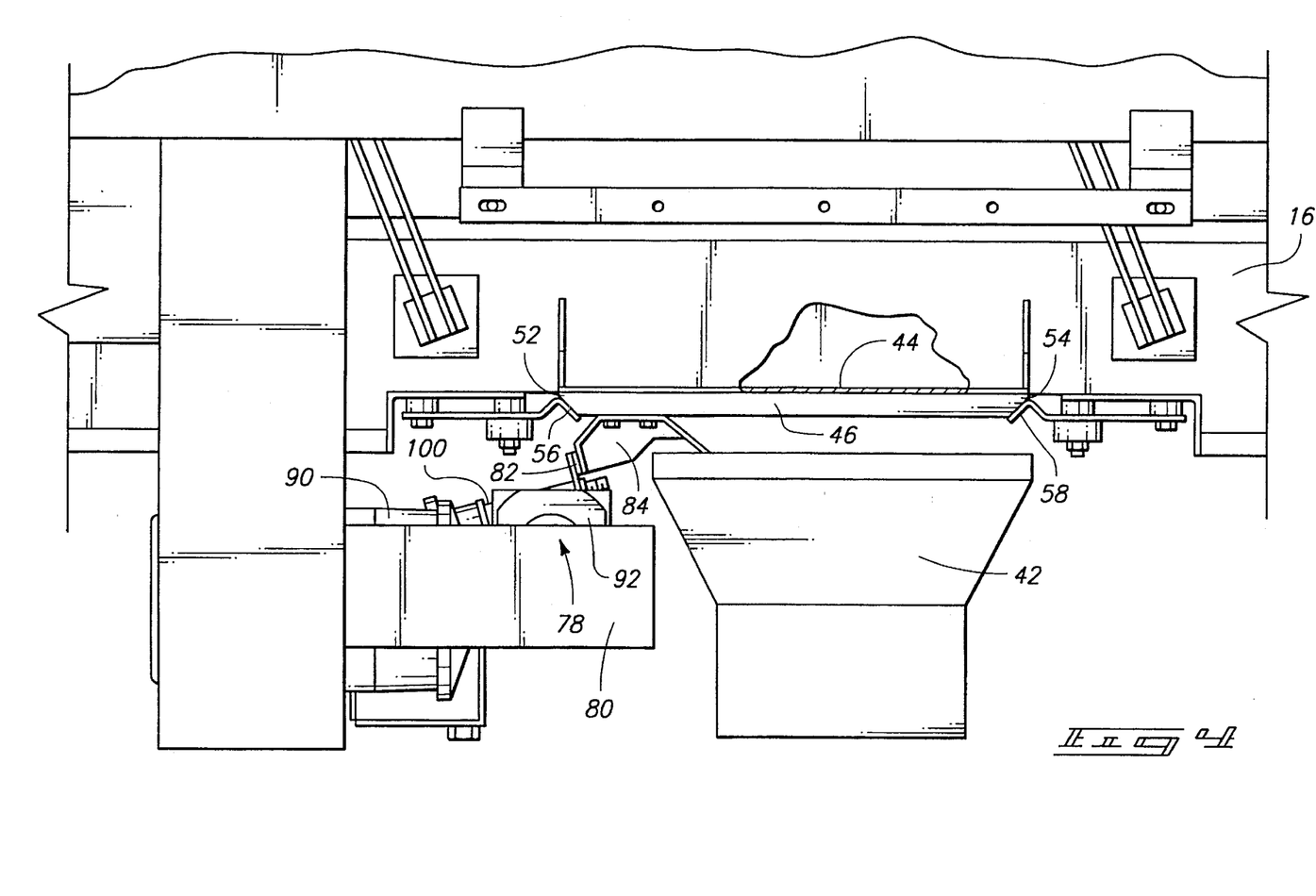
FIG. 4 is an enlarged fragmentary side view of one of the gate metering stations shown in FIG. 1.
Figure 5:
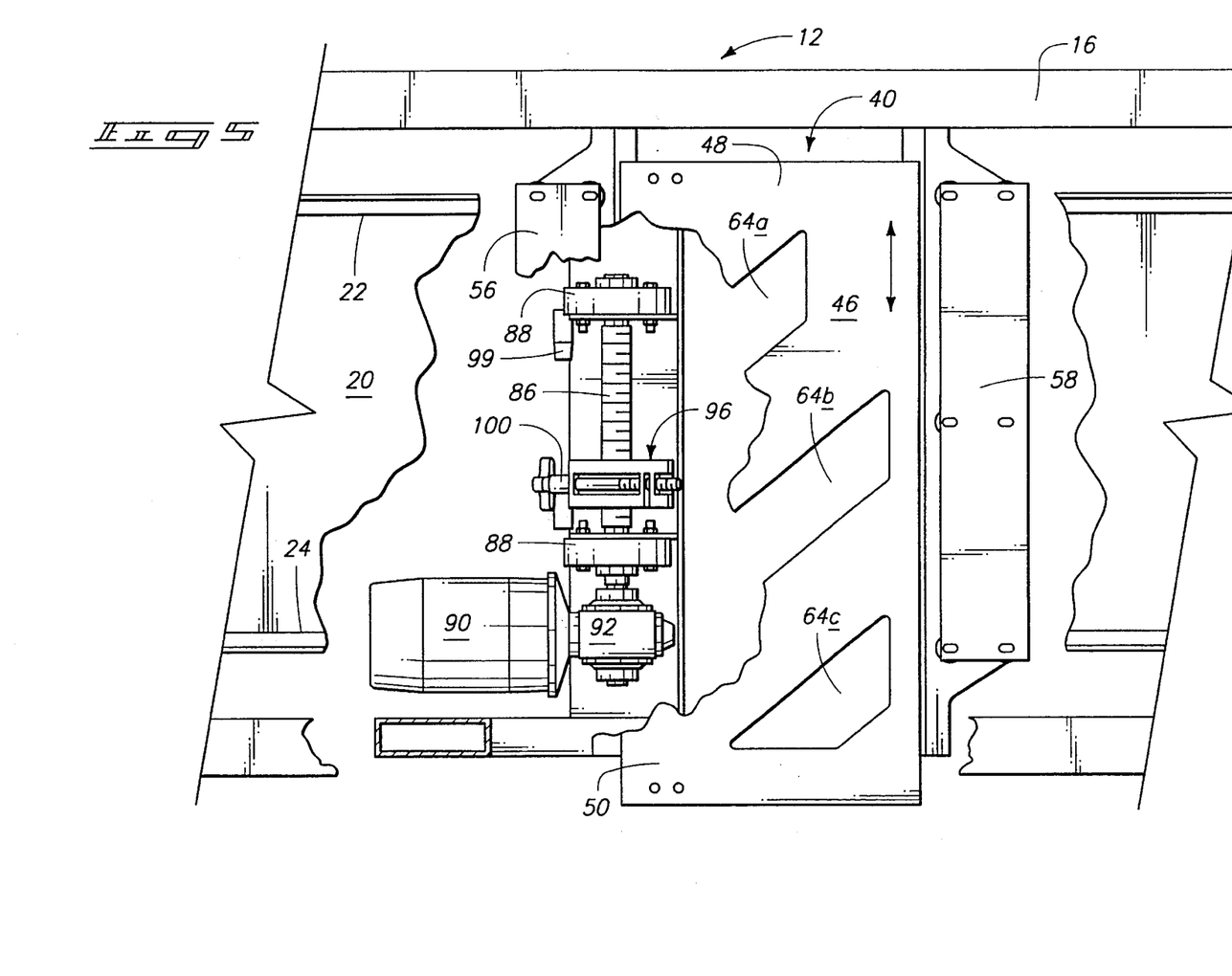
FIG. 5 is an enlarged fragmentary plan view of the gate station illustrated in FIG. 4 showing a gate metering drive system for selectively moving a gate to enlarge or restrict an opening at the gate metering station.
Figure 10:
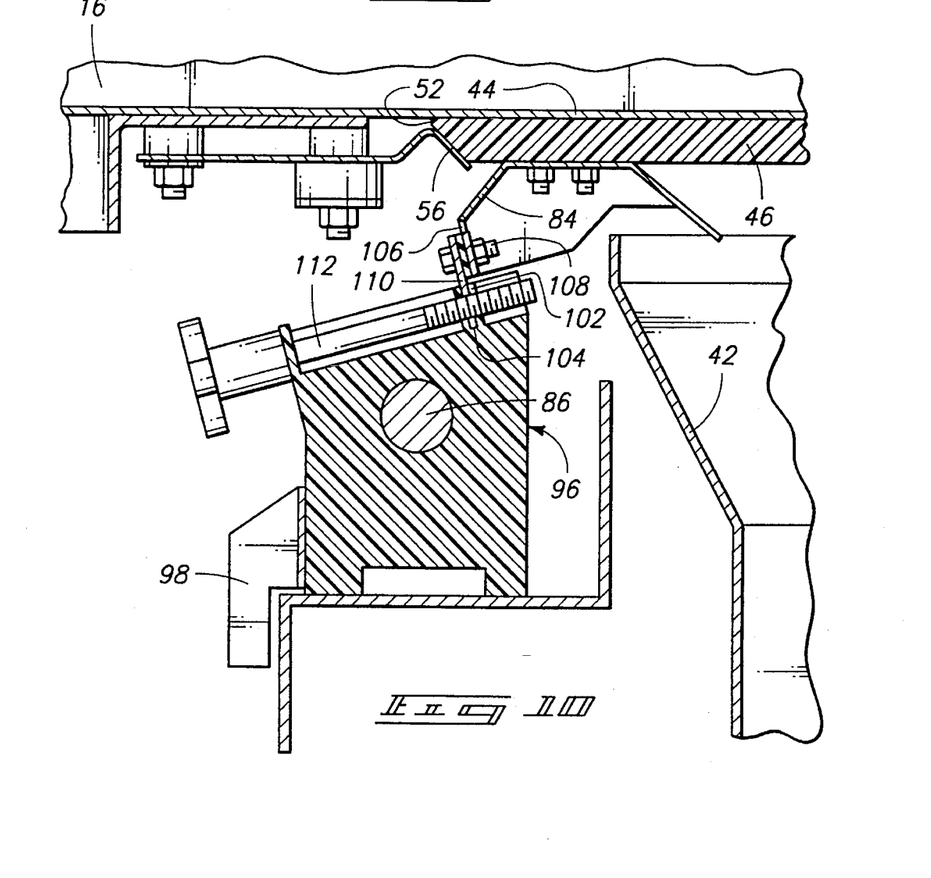
FIG. 10 is a fragmentary vertical cross-sectional view taken along line 10—10 in FIG. 3 illustrating a vibration dampening interconnection between a gate metering drive and a vibrating bed assembly.

The gate drive 78 is mounted and supported beneath the bed 16 on frame brackets 80 that extend downward from the overhead frame 14 as illustrated in FIG. 4. It is desirable to vibrationally isolate the gate drive 78 from the vibrational movement of the bed 16. This is accomplished by using a flexible rope or drive belt segment 82 that is hung between two depending mounting brackets 84 affixed to the underside of the gate element 46 (FIGS. 3 and 10). A belt attachment bracket 106 is affixed to the belt segment 82 midway between the brackets 84. The belt attachment bracket 106 includes attachment bolts 108 that secure the bracket 106 to the belt segment 82 (FIGS. 3 and 10). The bracket 106 has a depending drive tongue 110 that extends downward for releasable attachment to other components of the gate drive.

The belt segment 82 is sufficiently flexible in the direction of vibration of the bed 16 to prevent or at least greatly minimize the magnitude of vibration that is transferred from the bed 16 to the gate drive 78.

The gate drive 78 includes a lead screw 86 that is rotatably supported in end bearings 88 transverse to the flow direction. The gate drive 78 includes a motor 90 and gear box 92 for selectively rotating the lead screw 86. A screw nut assembly 96 is mounted on the lead screw 86 for longitudinal movement along the screw 86 as the screw 86 is rotated. A limit switch arm 98 is mounted on the nut assembly for engaging electrical limit switches 99 to stop the screw when the ends of the preset stroke are reached.

The screw nut assembly 96 has an attachment fixture 102 formed thereon to releasably attach the assembly 96 to the drive belt segment 82. The fixture 102 has a receiving slot 104 formed therein to receive the drive tongue 110. An attachment screw 112 is mounted on the nut assembly 96 for projecting through a hole in the drive tongue 110 to releasably attach the nut assembly 96 to the drive belt segment 82. Thus, the metering gate element 46 moves in coordination with the movement of the nut assembly 96 to control the placement of the metering gate element 46. To adjust the relative positions of the metering gate elements 44 and 46 at the ends of the stroke or to remove the lower gate element for cleaning or repair, it is only necessary to disconnect the adjustment screw 112 from the tongue 110 and move the lower element to its desired or removed position.

Figure 8:
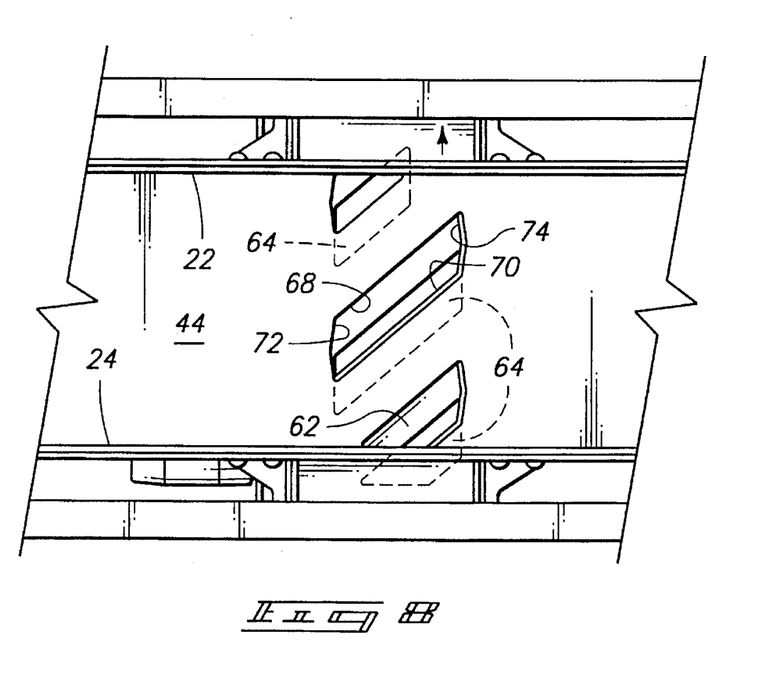
FIG. 8 illustrates the metering gate partially closed.

Operation of the metering gate assembly 40 is illustrated in sequence in FIG. 7–9. FIG. 9 illustrates the condition in which metering apertures 62, 64 are in the full open position (one end of the drive stroke) with the metering apertures 62 and 64 vertically aligned to permit maximum flow of the articles from the stream through the apertures and into the chute 42. It should be noted that since the elongated metering apertures 62, 64 are oriented diagonally and in laterally overlapping relationship, articles are taken rather uniformly across the entire width of the article stream including the side edges. It should be noted that the end 48 of the lower metering gate element 46 extends only a short distance outward from the side of the bed.

FIG. 8 illustrates the condition in which the metering apertures 62, 64 are partially open (middle of the stroke) with the metering apertures being partially vertically aligned to remove articles from wide segments of the wide swath because of the diagonal orientation of the elongated apertures 62, 64. It should be noted that the ends 48 and 50 of the lower metering gate element 46 do not extend outward from either side of the bed 16.

FIG. 7 illustrates the condition is which the metering apertures 62, 64 are fully closed (opposite end of the stroke) with the apertures being fully misaligned to prevent flow of he articles therethrough. It should be noted that the end 50 extends only a short distance from the side of the bed 16. It should be further noted that the stroke of the gate drive 78 is only approximately one-half of the interval distance between the apertures 62, 64 independently of the width of the bed 16. For example, if the lateral center-to-center distance between the apertures is twelve inches, then the stroke distance may be approximately six inches. This relationship exists independently of whether the stream width between the bed sides 22, 24 is twenty-four inches or seventy-two inches. Consequently, a very short stroke is able to meter articles across substantially the full width of the article stream. Such a configuration provides for a very accurate metering of the articles, more uniformly across the full width of the bed without enlarging the effective width of the bed 16.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A vibratory distributor for receiving bulk articles and conveying such bulk articles in an article stream past a plurality of metering gate stations for selectively metering and diverting bulk articles from the stream at one or more of the metering stations, comprising:

an elongated conveyor bed extending to the plurality of metering gate stations for receiving and supporting the bulk articles;

a vibratory drive operatively connected to the conveyor bed for vibrating the conveyor bed to convey the bulk articles in the stream having a wide swath between sides of the conveyor bed in a flow direction to the plurality of metering gate stations;

a metering gate assembly at each of the metering gate stations for selectively metering and diverting bulk articles from the stream across the wide swath;

each said metering gate assembly having two substantially horizontal, overlying metering gate elements in which the elements have complementary metering apertures formed therein that permit the bulk material to be diverted and pass therethrough when the apertures are vertically aligned and to prevent the bulk material from passing therethrough when the apertures are vertically misaligned;

wherein at least one of the metering gate elements is horizontally moveable relatively to the other metering gate element transverse to the article flow direction between an open aligned position to meter bulk articles therethrough and a closed misaligned position to prevent the passage of bulk articles therethrough; and wherein the metering apertures of each metering gate elements are arranged with a segment of each aperture laterally overlapping an adjacent aperture to permit diverting bulk, articles across the wide swath of the stream.

2. The vibratory distributor as defined in claim 1 wherein the metering apertures are oriented at a diagonal angle to the article flow direction.

3. The vibratory distributor as defined in claim 2 wherein each of the metering apertures are oriented at a diagonal angle of between 35 and 60 degrees relative to the article flow direction.

4. The vibratory distributor as defined in claim 1 wherein each of the metering apertures has a preset transverse width and wherein the metering apertures of each of the metering gates are laterally spaced at center-to-center intervals between the sides of the bed that are equal to or greater than the transverse widths of the apertures.

5. The vibratory distributor as defined in claim 1 wherein each of the metering apertures have two substantially parallel side edges.

6. The vibratory distributor as defined in claim 5 wherein a majority of the metering apertures have elongated parallelogram shapes.

7. The vibratory distributor as defined in claim 6 wherein each of the elongated metering apertures is oriented at a diagonal angle of between 35 and 60 degrees relative to the article flow direction.

8. The vibratory distributor as defined in claim 1 wherein the metering gate assembly has a metering gate drive operatively connected to the at least one gate element for selectively moving the at least element transversely relative to the article stream flow between the open aligned position and the closed misaligned position.

9. The vibratory distributor as defined in claim 8 wherein the metering gate drive has a vibration dampening drive connection operatively connected to the at least one gate element for selectively moving the at least one gate element while minimizing vibration transfer to the gate drive.

10. The vibratory distributor as defined in claim 1 wherein the metering gate elements define an upper metering gate element that forms a segment of the bed at the gate station and a lower metering gate element that is moveable transversely to the article stream flow direction below the upper metering gate element to align and misalign the element metering apertures.

11. The vibratory distributor as defined in claim 10 wherein the metering gate assembly include a gate element drive that is vibrationally isolated from the conveyor bed and operatively connected to the lower metering element to selectively move the lower metering gate element transversely to the article stream flow between the open aligned position and the closed misaligned position to selectively meter bulk articles from the stream at the metering gate stations.

12. A vibratory distributor for receiving bulk articles and conveying such bulk articles in a stream to a plurality of metering gate stations for selectively metering and diverting bulk articles from the stream at the metering gate stations, comprising:

an elongated conveyor bed extending to the plurality of metering gate stations for receiving and supporting the bulk articles;

a vibratory drive operatively connected to the conveyor bed for vibrating the conveyor bed to convey the bulk articles in a bulk stream having a wide swath between sides of the conveyor bed in a flow direction to the plurality of metering gate stations;

a metering gate assembly at each of the metering gate stations for selectively metering and diverting bulk articles from the main stream across the wide swath;

lack said metering gate assembly having two substantially horizontal, overlying metering gate elements;

wherein each of the metering gate elements has a plurality of elongated, laterally spaced metering apertures formed therein between the sides of the bed that correspond with complementary metering apertures of the other metering gate element that permit the bulk articles to pass therethrough when the complementary metering apertures of the two metering gate elements are vertically aligned and to prevent the bulk material from passing therethrough when the complementary apertures are vertically misaligned;

wherein the elongated metering apertures of each metering gate element are oriented diagonally to the flow direction at a diagonal angle sufficient to laterally overlap a segment of each aperture with a segment of an adjacent aperture to permit diverting bulk articles across the wide swath of the main stream, and wherein at least one of the metering gate elements is horizontally moveable relatively to the other metering gate element transverse to the article flow direction between an aligned open position to meter bulk articles through the metering apertures and a misaligned closed position m which the metering apertures are misaligned to prevent the passage of bulk articles therethrough.

13. The vibratory distributor as defined in claim 12 wherein the metering apertures of each metering gate element are evenly spaced laterally at a preset center-to-center interval distance between the sides of the bed.

14. The vibratory distributor as defined in claim 13 wherein the metering apertures have preset transverse widths that are equal to or less than the preset interval distance between the metering apertures.

15. The vibratory distributor as defined in claim 13 wherein the metering gate assembly comprises a metering gate drive operatively connected to the at least one gate element for selectively moving the at least one gate element in a transverse stroke relative to the article stream flow between the open position and the closed position in which the transverse stroke is substantially equal to one-half of the preset lateral center-to-center spacing distance.

16. The vibratory distributor as defined in claim 12 wherein each of the elongated metering apertures has two substantially parallel side edges in the elongated direction.

17. The vibratory distributor as defined in claim 16 wherein at least one of the metering apertures of each metering element has a parallelogram shape.

18. The vibratory distributor as defined in claim 17 wherein each of the metering apertures is oriented at a diagonal angle of between 35–60 degrees relative to the article flow direction.

19. The vibratory distributor as defined in claim 12 wherein each of the metering apertures is oriented at a diagonal angle of between 35 and 60 degrees relative to the article flow direction.

20. The vibratory distributor as defined in claim 12 wherein the metering gate assembly comprises a metering gate drive operatively connected to the at least one gate element for selectively moving the at least one gate element in a transverse stroke relative to the article stream flow between the open position and the closed position.

21. The vibratory distributor as defined in claim 20 wherein the metering gate drive has a vibration dampening drive connection operatively connected to the at least one gate element for selectively moving the at least one gate element while minimizing vibration transferred to the gate drive.

22. A vibratory distributor for receiving bulk articles and conveying such bulk articles in a stream to a plurality of metering gate stations for selectively metering and diverting bulk articles from the stream at the metering gate stations, comprising:

an elongated conveyor bed extending to the plurality of metering gate stations for receiving and supporting the bulk articles;

a vibratory drive operatively connected to the conveyor bed for vibrating the conveyor bed to convey the bulk articles in a bulk stream having a wide swath between sides of the conveyor bed in a flow-direction to the plurality of metering gate stations;

a metering gate assembly at each of the metering gate stations for selectively metering and diverting bulk articles from the main stream across the wide swath;

each said metering gate assembly having two substantially horizontal, overlying metering gate elements defining an upper metering gate element stationarily incorporated in the conveyor bed at the metering gate station and a transversely movable lower metering gate element below the upper metering gate element;

wherein each of the metering gate elements has a plurality of elongated, laterally spaced metering apertures formed therein between the sides of the bed that correspond with complementary metering apertures of the other metering gate element that permit the bulk articles to pass therethrough when the complementary metering apertures of the two metering gate elements are vertically aligned and to prevent the bulk material from passing therethrough when the complementary apertures are vertically misaligned;

wherein the laterally spaced metering apertures are laterally spaced a preset center-to-center distance between adjacent metering apertures;

wherein the elongated metering apertures of each metering gate element are oriented diagonally to the flow direction at a diagonal angle sufficient to laterally overlap a segment of each metering aperture with a segment of an adjacent metering aperture to permit diverting bulk articles across the wide swath of the main stream;

wherein the metering gate assembly has a transverse support for supporting and permitting the lower metering gate element to move transverse to the stream flow direction between an aligned open position to meter bulk articles through the metering apertures and a misaligned closed position in which the metering apertures are misaligned to prevent the passage of bulk articles therethrough; and wherein the metering gate assembly comprises a gate element drive that is operatively connected to the lower metering gate element to move the lower gate element in a metering stroke transverse to the stream flow direction in which the stroke is approximately equal to one-half of the preset center-to-center distance between adjacent metering apertures.

23. The vibratory distributor as defined in claim 22 wherein the metering apertures of each metering gate element are evenly spaced laterally at a preset interval center-to-center distance between the sides of the bed.

24. The vibratory distributor as defined in claim 23 wherein the metering apertures have preset transverse widths that are equal to or less than the preset lateral center-to-center distance between the metering apertures.

25. The vibratory distributor as defined in claim 22 wherein each of the elongated metering apertures has two substantially parallel side edges in the elongated direction.

26. The vibratory distributor as defined in claim 25 wherein at least one of the metering apertures of each metering element has a parallelogram shape.

27. The vibratory distributor as defined in claim 26 wherein the metering gate drive has a vibration dampening drive connection operatively connected to the lower gate element for selectively moving the lower gate element while minimizing vibration transferred to the gate drive.

28. The vibratory distributor as defined in claim 22 wherein each of the metering apertures is oriented at a diagonal angle of between 35 and 60 degrees relative to the article flow direction.

* * * * *

UNITED STATES PATENT AND TRADEMARK OFFICE
CERTIFICATE OF CORRECTION

PATENT NO. : 5,555,967
DATED : September 17, 1996
INVENTOR(S) : David W. Hueford It is certified that error appears in the above-indentified patent and that said Letters Patent is hereby corrected as shown below:

Column 6, line 44, after the words "at least", insert -- one gate --;

Column 7, line 17, delete the word --lack-- and insert -- each --;

Column 7, line 36, delete the word -- relatively -- and insert -- relative --;

Column 7, line 40, between the words "position" and "which" delete -- m-- and insert -- in --;

Signed and Sealed this

Twenty-eighth Day of January, 1997

Attest:

BRUCE LEHMAN

Attesting Officer    Commissioner of Patents and Trademarks